US008076385B2

(12) United States Patent
Ohama

(10) Patent No.: US 8,076,385 B2
(45) Date of Patent: Dec. 13, 2011

(54) USE OF FLAME RETARDANT AQUEOUS LIQUID COMPOSITION IN MAKING FLAME RETARDANT POLYURETHANE FOAM ARTICLE

(75) Inventor: Chiaki Ohama, Yokohama (JP)

(73) Assignee: Nankyo Efnica Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 12/638,200

(22) Filed: Dec. 15, 2009

(65) Prior Publication Data

US 2010/0093882 A1 Apr. 15, 2010

Related U.S. Application Data

(63) Continuation of application No. PCT/JP2008/060741, filed on Jun. 12, 2008.

(30) Foreign Application Priority Data

| Jun. 20, 2007 | (JP) | 2007-163125 |
| Aug. 10, 2007 | (JP) | 2007-209630 |
| Nov. 30, 2007 | (JP) | 2007-310701 |
| May 19, 2008 | (JP) | 2008-131080 |

(51) Int. Cl.
*C08G 18/24* (2006.01)

(52) U.S. Cl. ........ 521/120; 521/121; 521/124; 521/125; 521/128; 521/129; 521/130; 521/170

(58) Field of Classification Search .................. 521/121, 521/124, 125, 128, 129, 130, 170
See application file for complete search history.

(56) References Cited

U.S. PATENT DOCUMENTS

| 4,184,024 A * | 1/1980 | Klein | 521/167 |
| 7,205,346 B2 * | 4/2007 | Harashina | 524/133 |

FOREIGN PATENT DOCUMENTS

| JP | 50-1412659 | 11/1975 |
| JP | 61-124697 | 6/1986 |
| JP | 05-005272 | 1/1993 |
| JP | 05-186552 | 7/1993 |
| JP | 06-284395 | 9/1994 |
| JP | 09-119069 | 5/1997 |
| JP | 10-060447 | 3/1998 |
| JP | 10-183123 | 7/1998 |
| JP | 2000-087041 | 3/2000 |
| JP | 2001-002749 | 1/2001 |
| JP | 2001-131553 | 5/2001 |
| JP | 2002-020755 | 1/2002 |

* cited by examiner

*Primary Examiner* — John Cooney
(74) *Attorney, Agent, or Firm* — Bacon & Thomas, PLLC

(57) ABSTRACT

A flame retardant aqueous liquid composition containing water, guanidine sulfamate, a citric acid compound including a metal salt of citric acid, and a water soluble polymer. A flame retardant polyurethane foam is produced by a process including the steps of providing a mixture of the above flame retardant aqueous liquid composition with a polyol and an isocyanate, and reacting the mixture in the presence of a catalyst.

11 Claims, No Drawings

USE OF FLAME RETARDANT AQUEOUS LIQUID COMPOSITION IN MAKING FLAME RETARDANT POLYURETHANE FOAM ARTICLE

CROSS-REFERENCE TO RELATED APPLICATION

This application is a continuation-in-part of International Patent Application PCT/JP20081060741, filed Jun. 12, 2008, which claims, under 35 USC 119, priority of Japanese Patent Applications No. 2007-163125 filed Jun. 20, 2007, No. 2007-209630 filed Aug. 10, 2007, No. 2007-310701 filed Nov. 30, 2007, No. 2008-131080 filed May 19, 2008, the entire contents of each of the above PCT and Japanese patent applications being hereby incorporated by reference herein in their entirety.

BACKGROUND OF THE INVENTION

1. Field of the Invention

The present invention relates generally to a multifunctional composition having two or more functions such as flame retardancy, cleaning property, antifog property, antifouling property, antistatic property and moisture absorbing property and to use thereof. More specifically, the present invention relates to a flame retardant aqueous liquid composition, to a process for producing a flame retardant polyurethane foam, and to a flame retardant polyurethane foam article.

2. Description of Prior Art

Halogen-type flame retardants such as chlorine or bromine-containing flame retardants have been hitherto used to impart flame retardancy to various substrates such as woven and nonwoven fabrics of natural or synthetic resin fibers, sheets and molded articles of synthetic resins. Halogen-type flame retardants, however, have a drawback that a poisonous gas is generated during their manufacture or when they are combusted. Inhalation of the gas may cause death. The gas may be also accumulated in human bodies. Thus, there is a demand for a flame retardant which exhibits excellent flame retardancy, which does not generate a poisonous gas and which is not toxic to human bodies.

Fibrous material articles and resin foams are widely used as construction materials and automobile and airplane parts. In particular, polyurethane foams are used for a wide variety of applications such as cushioning materials for furnitures and automobile seats, bed mattresses, pillows, industrial sealing materials, sound proof materials and electric article parts. Because fibrous material articles and polyurethane foams easily start burning when exposed to a flame, however, it is important that flame retardancy should be imparted to them in order to practically use them for the above applications.

Thus, it is desired that fibrous material articles and resin foams used as construction materials and automobile and airplane parts meet UL-94 V0 rating requirements. However, no flame retardant has ever been known which does not generate a poisonous gas during their manufacture or when they are combusted and, at the same time, which is capable of imparting high flame retardancy of V0 rating by UL-94 to fibrous articles of polyester, etc. and to resin foams of polyurethane, etc.

In view of the above-described problems of the halogen-type flame retardant, the use of melamine powder flame retardant or phosphate flame retardant has been proposed as a substitute for the halogen-type flame retardant (JP-A-2001-2749). It is necessary, however, to use a large amount of melamine powder in order to achieve satisfactory flame retardancy. Therefore, a new problem arises because the physical property, such as softness, of a resin article or a resin foam containing melamine powder is deteriorated. In the case of the phosphate flame retardant, a new problem also arises because the resin article becomes sticky and discolored.

SUMMARY OF THE INVENTION

It is, therefore, the prime object of the present invention to provide a flame retardant aqueous liquid composition which can impart excellent flame retardancy to various articles such as polyurethane resin articles, which does not generate a poisonous gas such as halogen gas when heated, which can ensure safety of human bodies and which can be handled with ease.

Another object of the present invention is to provide a process for producing a polyurethane foam using such a flame retardant aqueous liquid composition.

It is a further object of the present invention is to provide a polyurethane foam using such a flame retardant aqueous liquid composition.

According to a broad aspect of the present invention, there is provided a multi-functional composition which comprises a non-cyclic guanidine compound containing a guanidine skeleton structure represented by the following formula (1)

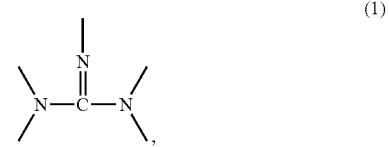

(1)

and at least one carboxyl compound selected from organic carboxylic acids, acid hydrides thereof, metal salts thereof and esters thereof.

In one specific aspect of the present invention, there is provided a flame retardant aqueous liquid composition, which comprises water, guanidine sulfamate dissolved in the water, a citric acid compound comprising a metal salt of citric acid dissolved in the water, and a water soluble polymer dissolved in the water.

In another specific aspect, the present invention provides a process for producing a flame retardant polyurethane foam, which comprises providing a mixture including the above flame retardant aqueous liquid composition, a polyol and an isocyanate, and reacting the mixture in the presence of a catalyst.

In a further specific aspect, the present invention provides a flame retardant polyurethane foam obtained by the above process.

The present invention also provides a flame retardant polyurethane foam article, which comprises a polyurethane foam, and a flame-retardingly effective amount of solids dispersed or contained in the polyurethane foam, the solids being derived from a flame retardant aqueous liquid composition containing water, guanidine sulfamate dissolved in the water, a citric acid compound including a metal salt of citric acid dissolved in the water, and a water soluble polymer dissolved in the water.

The multi-functional composition uses guanidine sulfamate that does not contain a phosphorus atom in its molecular structure. A compound used together with the guanidine sulfamate is selected from non-phosphorus compounds. Therefore, the multi-functional composition may be formulated into a phosphorus-free flame retardant composition which does not cause sticking and discoloration attributed to phosphorus atoms. Further, since the multi-functional composition does not contain a halogen-type flame retardant, no poisonous gas such as chlorine or bromine gas is generated during its manufacture or when it is combusted. Additionally, the guanidine compound is not accumulated in human bodies.

The multi-functional composition of the present invention may additionally contain a water soluble organic polymer and a hydrophilic inorganic material in the form of porous particles to form a multi-functional high viscosity aqueous liquid composition which may additionally exhibit antistatic effect, antifog effect, antifouling effect and cleaning effect. Because of the presence of the water soluble organic polymer, carbonization is further accelerated during combustion. The multi-functional composition can form a hydrophilic coating capable of maintaining the antistatic effect, antifog effect and antifouling effect.

Since the multi-functional high viscosity aqueous liquid composition which contains a water soluble organic polymer (organic viscosity increasing agent) and a hydrophilic inorganic material in the form of porous particles (inorganic viscosity increasing agent) has an increased viscosity, it may be used for the production of a polyurethane foam even though it contains water in a large amount. Incidentally, a non-halogen-type multifunctional aqueous liquid composition obtained by incorporating a water soluble organic polymer (organic viscosity increasing agent) alone to the multi-functional composition of an aqueous liquid type has an increased viscosity and, therefore, may be used in the production of a polyurethane foam.

A multifunctional polyurethane foam containing solids and powders derived from the multi-functional high viscosity aqueous liquid composition of the present invention has excellent flame retardancy, does not generate a poisonous gas when exposed to a flame, and does not cause significant changes in its property. Further, the composition when formulated into a phosphorus-free one, is not sticky and is hardly discolored.

According to the process for producing a multifunctional polyurethane foam, it is possible to obtain a multifunctional polyurethane foam having excellent flame retardancy, antistatic property, antifog property and cleaning property, even though the non-halogen-type multi-functional high viscosity aqueous liquid composition contains a large amount of water.

Other objects, features and advantages of the present invention will become apparent from the detailed description of the preferred embodiments of the invention to follow.

DETAILED DESCRIPTION OF THE PREFERRED EMBODIMENTS OF THE INVENTION

The multifunctional multipurpose composition of the present invention may be formulated into a variety of forms, such as an aqueous liquid composition, a powder composition, a high viscosity aqueous liquid composition and an emulsion, according to the intended use and contains, as essential ingredients, a non-cyclic guanidine compound containing a guanidine skeleton structure represented by the following formula (1)

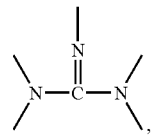

(1)

and at least one carboxyl compound selected from organic carboxylic acids, acid hydrides thereof, metal salts thereof and esters thereof.

As the non-cyclic guanidine compound, guanidine sulfamate represented by the following formula:

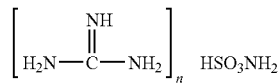

is preferably used. In the above formula, n is generally 0.5 to 3, preferably 0.7 to 2.5, more preferably 1 to 2.

As the carboxyl compound, a citric acid compound including a metal salt of citric acid is preferably used.

It is inferred that the flame retardancy of the flame retardant composition of the present invention is based on the following mechanism.

When a flame retardant material containing the flame retardant composition of the present invention is exposed to a flame, the citric acid compound is decomposed and carbonized at an early stage so that the material is covered with a carbonized material. Namely, when the citric acid compound is exposed to a flame, it is decomposed to generate carbon dioxide attributed to the carboxyl groups and is further pyrolyzed to form a carbon-rich material. The carbon-rich material covers surfaces of the flame retardant material to form a carbonized film.

Upon combustion, guanidine sulfamate is decomposed to generate nitrogen gas, ammonia, etc. while the citric acid compound is decomposed to generate carbon dioxide and water so that the flame retardant material is covered with these inflammable gases. Moreover, as described above, the citric acid compound is decomposed and carbonized in the atmosphere which is rich in the inflammable gases to form a thin layer of carbon (carbonized film) on surfaces of flame retardant material. Since oxygen is impermeable through the carbonized film which is an inflammable film, combustion of the flame retardant material is suppressed. In addition, since the flame retardant material is confined in the atmosphere which is rich in the inflammable gases, it is possible to achieve excellent flame retardancy. As a consequence, the fire goes out, as soon as a flame is removed from the flame retardant material.

When the flame retardant material is made of a thermoplastic or thermosetting resin, shrinkage thereof (carbonization shrinkage) occurs in simultaneous with the formation of a carbonized film. Therefore, dripping of flaming melt does not occur (no ignition by dripping occurs). Because the flame retardant aqueous liquid composition of the present invention has the above-mentioned effect, it is possible to impart flame retardancy of V0 rating by UL-94 to a flammable material such as fibers and polyurethane foams.

Incidentally, such carbonization shrinkage takes place in the case of synthetic resin articles only. Papers do not undergo significant carbonization shrinkage though simple carbonization occurs.

It is preferred that the content of the citric acid compound in the flame retardant aqueous liquid composition of the present invention is 5 to 70% by weight based on a total weight of the guanidine sulfamate and the citric acid compound. When the content of the citric acid compound is excessively small, there is a possibility that the carbonization and carbonization shrinkage do not sufficiently occur. Too large a content of the citric acid compound is not preferable because the flame retardancy is deteriorated. From the above point of view, the lower limit of the citric acid compound is preferably 7% by weight, more preferably 9% by weight, still more preferably 10% by weight, particularly preferably 15% by weight, while the upper limit thereof is preferably 60% by weight, more preferably 50% by weight, still more preferably 40% by weight, particularly preferably 30% by weight.

The flame retardant aqueous liquid composition of the present invention may contain a color toning material, an antibacterial agent or a surfactant.

In the flame retardant composition of the present invention, the citric acid compound and guanidine sulfamate may be in the form of a mixture or may be bound to each other by a certain interaction such as by ionic bonding.

The flame retardant aqueous liquid composition may be in a liquid or semi-solid form, such as an aqueous solution, aqueous dispersion, aqueous emulsion, aqueous gel, aqueous paste and high viscosity aqueous liquid. Hereinafter, flame retardant aqueous liquid composition in the form of an aqueous solution or dispersion will be first described and flame retardant aqueous liquid composition in the form of a high viscosity aqueous liquid will be described later.

The aqueous liquid composition of the present invention has a pH of 4 to 9, preferably 5 to 8, more preferably 6 to 8, still more preferably 6.5 to 7.5. When the acidity or alkalinity is strong, it is difficult to handle the composition. Further, strong alkalinity is not desirable because ammonia is apt to form from guanidine sulfamate.

A metal salt of citric acid is more soluble in water than citric acid is, and may be easily handled. When citric acid is used in a large amount, the acidity of the aqueous liquid composition is excessively increased. Thus, in order to prepare the aqueous liquid composition having a pH of 4 to 9, it is desirable to use a metal salt of citric acid as the citric acid compound and to use citric acid for adjusting the pH. In this case, other acid or an alkali may be used for final adjustment of the pH of the aqueous liquid composition.

In the citric acid compound, at least one of the carboxyl groups contained therein is in the form of a metal salt. Examples of the metal which constitutes the metal salt include alkali metals such as Na, K and Li, alkaline earth metals such as Ca, Mg and Ba and transition metals such as Zn, Mn and Ti. Above all, alkali metal salts such as a sodium salt and a potassium salt are particularly preferred for the purpose of the present invention.

In the flame retardant aqueous liquid composition of the present invention, the content of the flame retardant ingredients (a total content of the citric acid compound and guanidine sulfamate) is preferably 10 to 80% by weight, more preferably 30 to 70% by weight, still more preferably 40 to 60% by weight. When the content of the flame retardant ingredients is excessively small, effective flame retardancy may not be achieved. Too high a content of the flame retardant ingredients may cause deterioration of the drape of the fibrous articles and polyurethane foams.

When citric acid and a metal salt of citric acid are used in combination as the citric acid compound, the pH of the flame retardant aqueous liquid composition may be easily adjusted to 4 to 9. When citric acid which has high acidity is used by itself, the acidity of the flame retardant aqueous liquid composition becomes excessively high. On the other hand, when a metal salt of citric acid is used by itself, the composition becomes alkaline. Therefore, the conjoint use of them permits easy adjustment of the pH of the flame retardant aqueous liquid composition to 4 to 9, preferably 5 to 8, more preferably 6 to 8.

The high viscosity flame retardant aqueous liquid composition will be next described below. The high viscosity flame retardant aqueous liquid composition is obtained by mixing the above-described flame retardant aqueous liquid composition with a water soluble organic polymer and optionally a hydrophilic inorganic material in the form of porous fine particles.

Because of its high viscosity, the high viscosity flame retardant aqueous liquid composition may be used together with a polyol component and an isocyanate component for the production of a polyurethane foam that shows excellent flame retardancy, i.e. a first grade pass in the flame retardancy test method as specified by JIS Z2150; or meeting UL-94 V0 rating requirements.

The using amounts of the guanidine sulfamate and citric acid compound are the same as those in the above-described flame retardant aqueous liquid composition.

The water soluble organic polymer contained in the high viscosity flame retardant aqueous liquid composition is an organic polymer having polar groups (hydrophilic groups) such as a hydroxyl group, a carbonyl group, a carboxyl group, a sulfonic acid group, an ether group, an amino group and an urethane group.

Specific examples of the water soluble polymer include vegetable water soluble organic polymers such as gum arabic, gum tragacanth, arabinogalactan, locust bean gum (carob gum), guar gum, gum karaya, carageenan, pectin, agar, quince seed (marmelo), starch (rice, corn, potato, wheat), algae colloid and trant gum; microorganism-derived water soluble organic polymers such as xanthan gum, dextran, succinoglucan and pullulan; animal-derived water soluble organic polymers such as collagen, casein, albumin, and gelatin; starch-derived water soluble organic polymers such as carboxymethyl starch and methylhydroxypropyl starch; cellulose-based water soluble organic polymers such as methyl cellulose, ethyl cellulose, methylhydroxypropyl cellulose, carboxymethyl cellulose, hydroxymethyl cellulose, hydroxypropyl cellulose, nitrocellulose, sodium cellulose sulfate, sodium carboxymethyl cellulose (CMC), crystalline cellulose and cellulose powder; alginic acid-derived water soluble organic polymers such as sodium alginate and propylene glycol alginate; vinyl polymers such as polyvinyl methyl ether, polyvinylpyrrolidone and carboxyvinyl polymers; polyoxyethylene-based water soluble organic polymers such as polyethylene glycol; polyoxyethylene-polyoxypropylene copolymer-type water soluble organic polymers; acrylic-type water soluble organic polymers such as sodium polyacrylate, polyethyl acrylate and polyacrylamide; and urethane-based water soluble organic polymers such as polyether polyol-based urethane polymers. These water soluble organic polymers may be used singly or as a mixture thereof.

The water soluble organic polymer is used in an amount sufficient to impart a suitable viscosity to the high viscosity flame retardant aqueous liquid composition. The water soluble organic polymer is generally used in an amount of 0.1 to 10 parts by weight, preferably 0.5 to 8 parts by weight, per 100 parts by weight of water contained in the high viscosity flame retardant aqueous liquid composition.

The water soluble organic polymer used in the present invention is preferably an urethane-based water soluble polymer such as polyether polyol-based urethane polymer because of its excellent film-forming property, its function to accelerate the formation of a carbonized film by the citric acid compound upon being exposed to a flame, and its property to maintain the antistatic property, antifog property and antifouling property.

Specific examples of the polyether polyol-based urethane polymer usable for the present invention include the polymer disclosed in Japanese Kokoku Publication No. JP-B-H01-55292. The disclosed urethane polymer has at least three hydrophobic groups. At least two of the hydrophobic groups are terminal groups. The hydrophobic groups has at least 20 carbon atoms in total and are interconnected through hydrophilic polyester groups. The polymer has a number average molecular weight of 10,000 to 200,000.

The polymer is prepared using a reactant (a) comprising at least one polyether polyol, a reactant (b) comprising at least one organic polyisocyanate, a reactant (c) comprising at least one monofunctional active hydrogen-containing organic compound selected from monofunctional active hydrogen-containing compounds and/or organic monoisocyanates, and a reactant (d) comprising at least one polyhydric alcohol or polyhydric alcohol ester, and is a reaction product obtained by the following reactions:

(1) reaction between the reactant (a) comprising a polyether polyol containing at least three hydroxyl groups with the above-described monoisocyanate;

(2) reaction between the reactant (a), the reactant (b) comprising at least two isocyanate groups and the above-described monofunctional active hydrogen-containing compound;

(3) reaction between the reactant (a), the reactant (b) comprising at least three isocyanate groups and the above-described monofunctional active hydrogen-containing compound;

(4) reaction between the reactant (a), the reactant (b) and the above-described organic monoisocyanate;

(5) reaction between the reactant (a), the reactant (b), the above-described organic monoisocyanate and the reactant (d).

Reference shall be made to JP-B-H01-55292 for the details of the above polyether polyol.

For the purpose of the present invention, the polyether polyol-based urethane polymer disclosed in detail in Japanese Kokai Publication No. JP-A-H09-67562, the polyether polyol-based urethane polymer disclosed in detail in Japanese Kokai Publication No. JP-A-H09-71766, the polyether polyol-based urethane polymer disclosed in detail in Japanese Kokai Publication No. JP-A-H09-110821, the polyether polyol-based urethane polymer disclosed in detail in Japanese Kokai Publication No. JP-A-H10-245541, the polyether polyol-based urethane polymer disclosed in detail in Japanese Kokai Publication No. JP-A-H11-199854, the polyether polyol-based urethane polymer disclosed in detail in Japanese Kokai Publication No. JP-A-2000-239649, and the polyether polyol-based urethane polymer disclosed in detail in Japanese Kokai Publication No. JP-A-2002-226542. Reference shall be made to the above patent publications for the details of the above polyether polyol-based urethane polymers.

As an example of the commercial product of a polyether polyol-based urethane polymer as the water soluble organic polymer that may be suitably used for the purpose of the present invention, there may be mentioned ADEKANOL US420 manufactured by ADEKA Corporation.

The using amount of the polyether polyol-based urethane polymer (in case where a solid content of the urethane polymer is 30% by weight) is generally 5 to 30 parts by weight per 100 parts by weight of water. The lower limit is preferably 10 parts by weight, while the upper limit is preferably 20 parts by weight. Namely, the using amount of the polyether polyol-based urethane polymer in terms of its solid content is generally 1.45 to 7.44 parts by weight per 100 parts by weight of water contained in the high viscosity flame retardant aqueous liquid composition, with the lower limit being preferably 2.8 parts by weight and the upper limit being preferably 5.26 parts by weight.

The hydrophilic inorganic material in the form of porous fine particles (hereinafter occasionally referred to as "hydrophilic inorganic fine particles") to be incorporated into the high viscosity aqueous liquid composition may absorb water and shows viscosity increasing property when present in water and, therefore, may serve to function as an inorganic viscosity increasing agent. Hydrophobic inorganic fine particles which have been subjected to a hydrophilization treatment may also be usable. The hydrophilic inorganic fine particles may further increase the viscosity which has been increased by the above-described water soluble organic polymer (organic viscosity increasing agent) and may give a preferable influence upon the formation of foams when used for the production of polyurethane foams. Additionally, the hydrophilic inorganic fine particles themselves are inflammable and may support the guanidine sulfamate and metal salt of citric acid by absorption or adsorption. Therefore, the hydrophilic inorganic fine particles may function as nuclei for accelerating the carbonization and, therefore, may further improve the flame retardancy. Accordingly, the high viscosity aqueous liquid composition into which not only the water soluble organic polymer but also the hydrophilic inorganic fine particles are incorporated for the adjustment of the viscosity thereof may be suitably used for the production of flame retardant polyurethane foams.

Examples of the hydrophilic inorganic fine particles include crystalline silicates such as silicalite, natural zeolite, synthetic zeolite, montmorillonite, sepiolite and mixtures thereof; amorphous silicon compounds such as white carbon (water-containing amorphous silicon dioxide), amorphous silicic acid, water glass, perlite and mixtures thereof; clays such as clay, activated clay, diatomaceous earth, kaolin, bentonite, kibushi clay and gairome clay; metal oxides such as silica, alumina, silica gel, magnesium oxide, titania, alumina, zirconia, silica-alumina and silica-titania; and hydrides of metal sulfates such as calcium sulfate, iron sulfate, copper sulfate and magnesium sulfate.

Above all, crystalline or amorphous silicates or silicon compounds are preferred. Particularly preferred are synthetic zeolite, sepiolite and white carbon (water-containing amorphous silicon dioxide, $SiO_2 \cdot nH_2O$). Synthetic zeolite which is porous in nature and has good water absorbing power functions as a viscosity increasing agent. Further, synthetic zeolite can support the guanidine sulfamate and water soluble polymer thereon and acts as neclei for forming carbonized film. Moreover, because of its many hydroxyl groups, synthetic zeolite has a pH adjusting effect and has good dispersibility in water. The above also applies to white carbon.

Sepiolite has good viscosity increasing property. Swelling mica such as sodium tetrasilicic mica has good viscosity increasing property and may be suitably used. Wiskers of alumina may also be suitably used.

The above inorganic fine particles may be used in combination of two or more thereof. The compounding proportion of them may be determined in view of the desired viscosity adjustment effect, pH adjusting effect, carbonized film forming effect and dispersibility.

The average particle size of the inorganic fine particles is preferably 0.1 to 50 μm, more preferably 0.5 to 20 μm, still more preferably 0.5 to 10 μm. The inorganic fine particles whose average particle size falls within the above range are excellent in capability of adjusting the viscosity of the aqueous liquid and of supporting the guanidine compound, etc. thereon.

The content of the hydrophilic inorganic fine particles in the high viscosity aqueous liquid composition of the present invention is preferably 1 to 10 parts by weight, more preferably 2 to 6 parts by weight, per 100 parts by weight of water. When the content is 1 part by weight or more, good viscosity increasing effect, carbonized film forming effect and pH controlling effect may be achieved. When the content is 10 parts by weight or less, the viscosity increasing effect is not excessively high. Therefore, the high viscosity aqueous liquid composition may be applied uniformly over an object or may be contained or dispersed uniformly in an object. Further, cells of a polyurethane foam become uniform.

The viscosity of the high viscosity aqueous liquid composition of the present invention is increased in order to enable to produce a multifunctional flame retardant polyurethane foam. The viscosity of the high viscosity aqueous liquid composition may vary with the intended use thereof. Those skilled in the art will determine the optimum viscosity without difficulty. For example, when the viscosity is 6,000 cps or more, it is possible to use the composition for the production of polyurethane foams without adversely affecting the foaming of the polyurethane. The viscosity at 25° C. is preferably 6,000 to 30,000 cps, more preferably 7,000 to 25,000 cps, still more preferably 8,000 to 20,000 cps, particularly preferably 10,000 to 18,000 cps.

The viscosity herein is as measured at 25° C. with a BM-type viscometer (rotor: No. 4, rotation speed: 60 rpm).

The high viscosity aqueous liquid composition of the present invention may contain a color toning material and an antibacterial agent, if necessary. Further, for the purpose of improving drape of polyurethane foams, a surfactant may be incorporated into the composition. An aliphatic alcohol having 1 to 6 carbon atoms may also be added to the composition for the purpose of improving the dispersibility of the hydrophilic inorganic fine particles. As the aliphatic alcohol, ethanol is preferred for reasons of its easiness in handling and its weakness of odor.

Description will be next made of a flame retardant polyurethane foam of the present invention. The flame retardant polyurethane foam contains solids derived from the above-described high viscosity aqueous liquid composition of the present invention.

The flame retardant polyurethane foam may be produced by the following method (a) or method (b) using the above-described high viscosity aqueous liquid composition.

In the method (a), a mixture containing at least a polyol component and an isocyanate component is added to the above-described high viscosity aqueous liquid composition. The resulting mixture is then reacted in the presence of a foaming agent to obtain a polyurethane foam.

In the method (b), an isocyanate component is added to a mixture containing at least a polyol component and the above-described high viscosity aqueous liquid composition. The resulting mixture is then reacted in the presence of a foaming agent to obtain a polyurethane foam.

The polyurethane foam obtained by each of the methods (a) and (b) is good flame retardant foam though it has been produced using the high viscosity aqueous liquid composition containing a large amount of water. When the isocyanate component is first added to the high viscosity aqueous liquid composition before the isocyanate component is mixed with the polyol component, foaming does not smoothly proceed so that the obtained foam is tattered.

The method in which a mixture of a polyol component and an isocyanate component is added to the high viscosity aqueous liquid composition or an isocyanate component is added to a mixture of a polyol component and the high viscosity aqueous liquid composition might be said to be simple in itself. But, the effectiveness of this method has been first found by the present inventor. This method is contrary to the technical common sense that foamability is adversely affected if water is present in a large amount.

The density of the flame retardant foam obtained by the above methods (a) and (b) varies with the amount of the foaming agent, but is generally preferably 10 to 1,200 kg/m$^3$, more preferably 200 to 800 kg/m$^3$.

The polyurethane foam may be produced by using the flame retardant aqueous liquid composition which is prepared by adding only the water soluble organic polymer to the above-described flame retardant aqueous liquid composition or by using a powder derived from the flame retardant aqueous liquid composition. In this case, the flame retardancy is significantly improved by using a polyether polyol-based urethane polymer as the water soluble organic polymer because the formation of carbonized films is accelerated.

The polyol component and isocyanate component used in the process for the production of polyurethane foams according to the present invention (methods (a) and (b)) are not specifically limited. Those which are customarily generally used for the production of polyurethanes may be used without limitation.

Examples of the polyol component include low molecular weight polyol such as ethylene glycol, propylene glycol, butylenes glycol, diethylene glycol, trimethylolpropane, hexane triol, glycerin, trimethylolethane and pentaerythritol; polycaprolactone polyol; polyester polyols produced from polybasic acids and hydroxyl compounds; and polyether polyols such as polyoxyethylene glycol, polyoxypropylene glycol, poly(oxypropylene) poly(oxyethylene) glycol, poly (oxybutylene) glycol and poly(oxytetramethylene) glycol. Acryl polyols and derivatives of castor oil or tall oil may also be used as the polyol component.

As the isocyanate component, there may be mentioned, for example, aliphatic isocyanates, aromatic icocyanates and modified products thereof.

Examples of the aliphatic isocyanate include hexamethylene diisocyanate. Examples of the aromatic isocyanate include diphenylmethane diisocyanate, polymeric diphenyl isocyanate, tolylene diisocyanate, xylylene diisocyanate, naphthalene diisocyanate and triphenylmethane triisocyanate. Examples of the modified isocyanate include urethane prepolymers.

The flame retardant polyurethane foam of the present invention may be prepared in accordance with the customarily employed process. Thus, as a process for the preparation of polyurethane chains, there may be used a one shot process, a prepolymer process or a quasi-prepolymer process. As a process for the production of polyurethane foams, there may be used a slab method or a mold method.

As the foaming agent used for the production of the flame retardant polyurethane foam by the above methods (a) and (b), the water contained in the high viscosity aqueous liquid composition of the present invention may be used. Water as the foaming agent may also be incorporated into the polyol component. The expansion ratio of the foam may be controlled by adjusting the using amount of the isocyanate component. As the amount of the polyisocyanate increases, the amount of carbon dioxide generated increases so that the expansion ratio becomes high. On the other hand, by reducing the using amount of the polyisocyanate, the amount of carbon dioxide generated decreases so that the expansion ratio becomes low.

Any of various foaming agents such organic foaming agents and inorganic foaming agents generally used in the production of polyurethane may also be used together with water. The organic foaming agent includes, for example, a nitroalkane, nitrourea, an aldoxime, an active methylene compound, an acid amide, a tertiary alcohol and oxalic acid hydrate. The inorganic foaming agent includes, for example, trichloromonofluoromethane, dichlorodifluoromethane, boric acid, solid carbon dioxide, liquid carbon dioxide and aluminum hydroxide.

In order to control the rate of reaction between the polyol component and the isocyanate component, it is necessary that a catalyst should be present in the reaction system. Any catalyst customarily employed for the production of polyurethane may be used according to the desired pot life. Illustrative of suitable catalysts are Lewis bases such as amines and is phosphines and organic metal (such as aluminum and tin) compounds of Lewis acids. It is desirable that the catalyst be incorporated into the isocyanate component.

A known organosilicone-based surfactant may be incorporated into the reaction system as a foam controlling agent. For reasons of stabilized foaming, diethanol amine or triethanol amine may be suitably added.

The above-described various components are mixed and reacted for the production of a flame retardant polyurethane foam. Any mixing device customarily employed for the formation of polyurethane foam, such as a mechanical stirrer, an air mixing device, may be used for stirring the reaction mixture.

The heat required for the formation of the flame retardant polyurethane foam of the present invention may be autogenously generated. However, the reaction mixture may be heated from outside to 100 to 150° C., if desired, depending on the reactivity of the polyol component and isocyanate component used.

The flame retardant polyurethane foam of the present invention preferably has a content of the solids, which are derived the high viscosity flame retardant aqueous liquid composition, of 5 to 50% by weight, more preferably 10 to 40% by weight, still more preferably 15 to 30% by weight, based on the weight of the flame retardant polyurethane foam. When the solids content is 5% by weight or more, satisfactory flame retardancy may be achieved. When the solids content is 50% by weight or less, there is no fear of deterioration of the physical properties of the polyurethane foam.

The amount of the high viscosity flame retardant aqueous liquid composition relative to a total amount of the polyol component and isocyanate component varies with the content of water of the high viscosity flame retardant aqueous liquid composition and is generally 25 to 400 parts by weight, preferably 60 to 250 parts by weight, more preferably 80 to 170 parts by weight, per 100 parts by weight of the total amount of the polyol component and isocyanate component, in case where the high viscosity flame retardant aqueous liquid composition has a solids content of 40% by weight (water content of 60% by weight). Namely, the amount of the high viscosity flame retardant aqueous liquid composition, in terms of its solids content, is generally 10 to 160 parts by weight, preferably 24 to 100 parts by weight, more preferably 32 to 68 parts by weight, per 100 parts by weight of the total amount of the polyol component and isocyanate component.

When the amount of the high viscosity flame retardant aqueous liquid composition is excessively small, there is a possibility that the flame retardancy of the obtained foam is deteriorated. The using amount of the isocyanate component relative to the polyol component is generally 15 to 40 parts by weight per 100 parts by weight of the polyol component and is suitably determined in view of the intended expansion ratio.

The high viscosity aqueous liquid composition of the present invention may contain a compound obtained by reacting a cyclic aminotriazine-based nitrogen compound with cyanuric acid or isocyanuric acid. When the polyol component and isocyanate component are reacted together with the compound in the presence of a foaming agent, the obtained polyurethane foam contains the compound as one of its constituents, so that the flame retardancy of the foam is further improved.

As the above compound, melamine cyanurate is particularly preferred for reasons of easiness in availability and inexpensiveness. When the polyurethane foam is produced using melamine cyanurate by the above-described method (a) or (b), the melamine cyanurate may be added to and dispersed in the polyol component aqueous liquid composition or may be added to and dispersed the aqueous liquid composition.

The flame retardant polyurethane foam containing melamine cyanurate has not only an improved flame retardancy but also increased hardness and toughness and, therefore, may be suitably used as a cleaning device. The toughness of the polyurethane foam may be controlled by adjustment of the amount of the melamine cyanurate. For example, the using amount of melamine cyanurate is preferably 5 to 50 parts by weight, more preferably 8 to 40 parts by weight, still more preferably 10 to 30 parts by weight, per 100 parts by weight of an aqueous liquid containing 50% by weight of the solids derived from the high viscosity aqueous liquid composition.

The flame retardant polyurethane foam of the present invention has excellent flame retardancy and may be suited for use as a cushioning material for construction materials, furnitures and vehicles such as airplanes and automobiles.

The following examples will further illustrate the present invention. Parts and percentages are by weight.

EXAMPLES 1 AND 2 AND COMPARATIVE EXAMPLES 1 AND 2

Using a high speed mixer (Model MX-45 manufactured by AIHO Corporation), the carboxyl compound and guanidine compound (the amount and kind are as shown in Table 1-1 and Table 1-2) were dissolved in 1,000 mL of warm water at 65° C. with high speed stirring. To the obtained solution, the water soluble organic polymer and hydrophilic inorganic fine particles (the amount and kind are as shown in Table 1-1 and Table 1-2) were successively added and the mixture was allowed to spontaneously cool with high speed stirring to obtain high viscosity aqueous liquid compositions having formulations as shown in Table 1-1 and Table 1-2.

TABLE 1-1

|  |  | Example 1 | Example 2 |
|---|---|---|---|
| Warm water at 65° C. |  | 100 | 100 |
| Guanidine compound | Kind | Guanidine sulfamate *1 | Guanidine sulfamate *1 |
|  | Amount (part by weight) | 67 | 67 |
| Carboxyl compound | Kind | Sodium citrate *3/ Citric acid | Sodium citrate *3/ Citric acid |
|  | Amount (part by weight) | 13.3/1.7 | 13.3/1.7 |
| Water soluble polymer | Kind | Polyether polyol-based urethane polymer *4 | Polyether polyol-based urethane polymer *4 |
|  | Amount (part by weight) | 17 | 17 |
| Hydrophilic inorganic fine particles | Kind | White carbon *5/ Synthetic zeolite *6 | — |
|  | Amount (part by weight) | 3.5/5 | — |
| Content of guanidine compound (wt. %) |  | 32.3 | 33.7 |
| Content of carboxyl compound (wt. %) |  | 7.2 | 7.5 |
| Content of water soluble polymer (wt. %, solid content) |  | 2.5 | 2.6 |
| Content of hydrophilic inorganic fine particles (wt. %) |  | 1.7/2.4 | — |
| Physical properties | pH | 6.5 | 6.5 |
|  | Foamability of polyurethane | Excellent | Good |
|  | Flame retardancy (JIS Z2150) | Grade 1 | Grade 1 |

TABLE 1-2

|  |  | Comparative Example 1 | Comparative Example 2 |
|---|---|---|---|
| Warm water at 65° C. |  | 100 | 100 |
| Guanidine compound | Kind | Guanidine sulfamate *1 | Guanidine sulfamate *1 |
|  | Amount (part by weight) | 67 | 67 |
| Carboxyl compound | Kind | — | Sodium citrate *3/ Citric acid |
|  | Amount (part by weight) | — | 13.3/1.7 |
| Water soluble polymer | Kind | Polyether polyol-based urethane polymer *4 | — |
|  | Amount (part by weight) | 17 | — |
| Hydrophilic inorganic fine particles | Kind | White carbon *5/ Synthetic zeolite *6 | White carbon *5/ Synthetic zeolite *6 |
|  | Amount (part by weight) | 3.5/5 | 3.5/5 |
| Content of guanidine compound (wt. %) |  | 34.8 | 35.2 |
| Content of carboxyl compound (wt. %) |  | — | 7.9 |
| Content of water soluble polymer (wt. %, solid content) |  | 2.6 | — |
| Content of hydrophilic inorganic fine particles (wt. %) |  | 1.8/2.6 | 1.8/2.6 |
| Physical properties | pH | 7.5 | 6.5 |
|  | Foamability of polyurethane | Excellent | Poor |
|  | Flame retardancy (JIS Z2150) | Grade 2 | — |

Remarks:
*1 Guanidine sulfamate (APINON-101 manufactured by Sanwa Chemical Co., Ltd.; 1% by weight aqueous solution has pH of 7.5)
*3 Trisodium citrate ($C_6H_5Na_3O_7 \cdot 2H_2O$; 10% by weight aqueous solution has pH of 8)
*4 Water soluble polyurethane (ADEKANOL UH-420 manufactured by ADEKA Corporation; Solid content: 30% by weight)
*5 Water-containing amorphous silica (NIPALL NS-P manufactured by Toso Silica Co., Ltd.)
*6 Zeolite (ZEOBUILDER available from Sanyo Chemical Co., Ltd.)

EXAMPLE 3

Preparation of Polyurethane Foam

80 Parts by weight of a polyol component (Polyol System FNC-404, manufactured by Asahi Glass Co., Ltd.) were mixed with 20 parts by weight of an isocyanate component (CORONATE 1025 manufactured by Nippon Polyurethane Industry Co., Ltd.; mixture of 50% by weight of tolylene diisocyanate (containing 2,6-tolylene diisocyanate), 20% by weight of 4,4'-diphenylmethane diisocyanate, polymethylene polyphenyl polyisocyanate and a catalyst) with stirring, to which was then added 80 parts by weight of the high viscosity aqueous liquid composition obtained in Example 1, thereby obtaining a polyurethane foam having an apparent density of 0.11 g/cm$^3$. The obtained polyurethane foam was not at all sticky, had no problem with respect to its drape, was not discolored and was free of deterioration of its physical properties. The foamability was excellent as indicated in Table 1-1.

EXAMPLE 4 AND COMPARATIVE EXAMPLES 3 AND 4

Preparation of Polyurethane Foam

Example 3 was carried out in the same manner as described except for using the aqueous liquid composition obtained in each of Example 2 and Comparative Examples 1 and 2 was used in place of the aqueous liquid composition obtained in Example 1. In Comparative Example 3 in which the flame retardant composition of Comparative Example 1 was used, the obtained polyurethane foam showed excellent foamability. The foamability of the polyurethane foam obtained in Example 4 using the flame retardant composition of Example 2 was good but was not excellent as compared with the polyurethane foam of Example 3. Because of low viscosity, the foamability was so poor in Comparative Example 4 that a polyurethane foam was not obtained.

EXAMPLE 5

Preparation of Polyurethane Foam

To a flame retardant aqueous liquid composition having the same formulation as that of Example 1, melamine cyanurate (MC-610 manufactured by Nissan Chemical Industries, Ltd.) was added in an amount of 10 parts by weight. 100 Parts by weight of a polyol component (Polyol System FNC-404, manufactured by Asahi Glass Co., Ltd.) were mixed with 20 parts by weight of an isocyanate component (CORONATE 1025 manufactured by Nippon Polyurethane Industry Co., Ltd.; mixture of 50% by weight of tolylene diisocyanate (containing 2,6-tolylene diisocyanate), 20% by weight of 4,4'-diphenylmethane diisocyanate, polymethylene polyphenyl polyisocyanate and a catalyst) and 200 parts by weight of the above high viscosity aqueous liquid composition, thereby obtaining a polyurethane foam having an apparent density of 0.26 g/cm$^3$. The obtained polyurethane foam was free of stickiness or discoloration and had good toughness suitable for use as a cleaning device. The flame retardancy was also good and no dripping of melt was caused when exposed to a flame.

Flame Retardancy Test 1:

Each of the polyurethane foams obtained in Examples 3 to 5 and Comparative Example 3 was exposed to a flame of a burner for 10 seconds in accordance with the test method described in JIS Z 2150. The foams of Examples 3 to 5 had a carbonized length of less than 5 mm and passed the flame proofness grade 1. The foam of Comparative Example 3, however, was only equivalent to JIS A 1322 flame proofness grade 2.

Flame Retardancy Test 2:

The polyurethane foam obtained in Example 3 was cut to obtain 10 sheets of test specimens each having a width of 50 mm, length of 150 mm and a thickness of 13 mm. Each of the test specimens was subjected to UL-94 burning test as follows. The test specimen was suspended vertically by a clamp on a ring stand placed in a non-ventilated chamber. A Bunsen burner was then ignited and adjusted to produce a blue flame of 38 mm height. The flame was placed centrally under the lower end of the test specimen and allowed to remain for 60 seconds. The flame was then withdrawn, and the duration of flaming, afterglow time and damaged length were measured. Also, the presence or absence of ignition of cotton by dripping was determined. The results were as shown in Table 2 below, from which it is appreciated that the polyurethane foam obtained in Example 3 is classified as V0 rating. The foregoing flame retardancy test was carried out by Japan Textile Products Quality and Technology Center, Fukui Test Center.

TABLE 2

| | | | Duration of flaming (second) | Afterglow time (second) | Damaged length (mm) | Cotton ignition by dripping |
|---|---|---|---|---|---|---|
| Flame retardancy test (Example 3) | Test number | 1 | 0 | 0 | 25 | none |
| | | 2 | 0 | 0 | 28 | none |
| | | 3 | 0 | 0 | 28 | none |
| | | 4 | 0 | 0 | 30 | none |
| | | 5 | 0 | 0 | 29 | none |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process for producing a flame retardant polyurethane foam, comprising the steps of:
    providing a mixture comprising a flame retardant aqueous liquid composition, a polyol and an isocyanate; and
    reacting said mixture in the presence of a catalyst;
    wherein the flame retardant aqueous liquid composition comprises water, guanidine sulfamate dissolved in the water, a citric acid compound comprising a metal salt of citric acid dissolved in the water, and a water soluble polymer dissolved in the water; and
    wherein the water soluble polymer is at least one polymer selected from the group consisting of cellulose-based water soluble organic polymers, water soluble vinyl polymers, polyoxyethylene-based water soluble organic polymers, water soluble polyoxyethylene-polyoxypropylene copolymers, water soluble acrylic polymers, water soluble urethane polymers, gum arabic, gum tagacanth, arabinogalactan, locust bean gum, guar gum, gum karaya, carageenan, pectin, agar, guince seed, starch, algae colloid, trant gum, xanthan gum, dextran, succinoglucan, pullulan, collagen, casein, albumin, gelatin, carboxymethyl starch, methylhydroxypropyl starch, sodium alginate and propylene glycol alginate.

2. A process as recited in claim 1, wherein the citric acid compound comprises citric acid in addition to the metal salt of citric acid and wherein the flame retardant aqueous liquid composition has a pH of 6 to 8.

3. A process as recited in claim 1, wherein the flame retardant aqueous liquid composition has a viscosity of 6,000 to 30,000 cps at 25° C.

4. A process as recited in claim 1, wherein the citric acid compound is present in an amount of 5 to 50% by weight based on a total weight of the guanidine sulfamate and the citric acid compound.

5. A process as recited in claim 1, wherein a total amount of the guanidine sulfamate and the citric acid compound is 30 to 70% by weight based on the weight of the flame retardant aqueous liquid composition.

6. A process as recited in claim 1, wherein said mixture further comprises melamine cyanurate.

7. A process as recited in claim 1, wherein said mixture further comprises a hydrophilic inorganic material in the form of porous fine particles.

8. A process as recited in claim 7, wherein the hydrophilic inorganic material is at least one substance selected from the group consisting of synthetic zeolite, sepiolite and white carbon, and is present in an amount of 1 to 10 parts by weight per 100 parts by weight of the water contained in said mixture.

9. A process as recited in claim 1, wherein said mixture is additionally mixed with a foaming agent.

10. A process as recited in claim 1, wherein the water soluble polymer is at least one polymer selected from the group consisting of water-soluble urethane polymers, cellulose-based water soluble polymers and water soluble acrylic polymers.

11. A process for producing a flame retardant polyurethane foam, comprising the steps of:
providing a mixture comprising a flame retardant aqueous liquid composition, a polyol and an isocyanate; and
reacting the mixture in the presence of a catalyst,
wherein the flame retardant aqueous liquid composition comprises water, guanidine sulfamate dissolved in the water, a citric acid compound comprising a metal salt of citric acid dissolved in the water, and a water soluble polymer dissolved in the water, and
wherein said water soluble polymer is an organic polymer having polar groups selected from the group consisting of hydroxyl groups, carbonyl groups, carboxyl groups, ether groups, amino groups and urethane groups.

* * * * *

UNITED STATES PATENT AND TRADEMARK OFFICE
CERTIFICATE OF CORRECTION

PATENT NO. : 8,076,385 B2  
APPLICATION NO. : 12/638200  
DATED : December 13, 2011  
INVENTOR(S) : Chiaki Ohama Page 1 of 1

It is certified that error appears in the above-identified patent and that said Letters Patent is hereby corrected as shown below:

FACE PAGE, Item (56):

Change "JP   06-284395    9/1994" to --JP    06-264395    9/1994--

Signed and Sealed this  
Sixth Day of March, 2012

David J. Kappos  
*Director of the United States Patent and Trademark Office*